United States Patent
Abe et al.

(10) Patent No.: US 11,018,480 B2
(45) Date of Patent: May 25, 2021

(54) BUS BAR ELECTRIC WIRE WITH A BENT PORTION OF UNIFORM ELONGATION

(71) Applicant: YAZAKI CORPORATION, Tokyo (JP)

(72) Inventors: Noriyuki Abe, Susono (JP); Hiroki Kondo, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/714,657

(22) Filed: Dec. 13, 2019

(65) Prior Publication Data

US 2020/0227897 A1  Jul. 16, 2020

(30) Foreign Application Priority Data

Jan. 16, 2019 (JP) .............................. JP2019-005325

(51) Int. Cl.
*H02B 1/20* (2006.01)

(52) U.S. Cl.
CPC ................................. *H02B 1/207* (2013.01)

(58) Field of Classification Search
CPC ....................................................... H02B 1/207
USPC ........................................................ 174/68.2
See application file for complete search history.

(56) References Cited

U.S. PATENT DOCUMENTS

| | | | |
|---|---|---|---|
| 9,748,826 B2* | 8/2017 | Matsushita | H02K 3/18 |
| 10,074,461 B2* | 9/2018 | Lausch | H01B 7/0018 |
| 10,483,013 B2* | 11/2019 | Oya | H01B 3/427 |
| 2013/0240244 A1* | 9/2013 | Honda | H01B 3/306 |
| | | | 174/119 C |
| 2014/0360756 A1* | 12/2014 | Honda | H01B 3/308 |
| | | | 174/119 C |
| 2017/0213620 A1 | 7/2017 | Lausch et al. | |

FOREIGN PATENT DOCUMENTS

| | | |
|---|---|---|
| CN | 106575548 A | 4/2017 |
| JP | 2013-4444 A | 1/2013 |
| JP | 2014-229415 A | 12/2014 |
| JP | 2014-238927 A | 12/2014 |
| JP | 2016-76316 A | 5/2016 |
| JP | 2017-51962 A | 3/2017 |

(Continued)

OTHER PUBLICATIONS

Engineer On A Disk 1.4 Bending http://engineeronadisk.com/V2/notes_manufacturing/engineeronadisk-105.html (Year: 2017).*

(Continued)

*Primary Examiner* — Timothy J Thompson
*Assistant Examiner* — Michael F McAllister
(74) *Attorney, Agent, or Firm* — Kenealy Vaidya LLP

(57) ABSTRACT

A bus bar electric wire includes a flat conductor which is formed of aluminum and inevitable impurities, and which has a cross-section of a substantially rectangular shape. An area of the cross-section is 15 mm$^2$ or more and 240 mm$^2$ or less. The flat conductor includes a bent portion having a predetermined bending R in a plane direction of the flat conductor, and a conductor part that is an outermost side of a bend in the bent portion has a plate width being set within a range satisfying uniform bending of the conductor part.

4 Claims, 2 Drawing Sheets

(56) References Cited

FOREIGN PATENT DOCUMENTS

JP   2018-160317 A   10/2018

OTHER PUBLICATIONS

Engineer On A Disk 1.4 Bending http://engineeronadisk.comN2/notes_manufacturing/engineeronadisk-105.html (Year: 2017).*

Qin Yiming et al.; "Relationship between Bending and Tensile Properties of 5182 H111 Aluminum Alloy Plate"; Nonferrous Metals Processing; Jun. 2018; vol. 47 No. 3; pp. 33-36, See English Abstract at end of article.

* cited by examiner

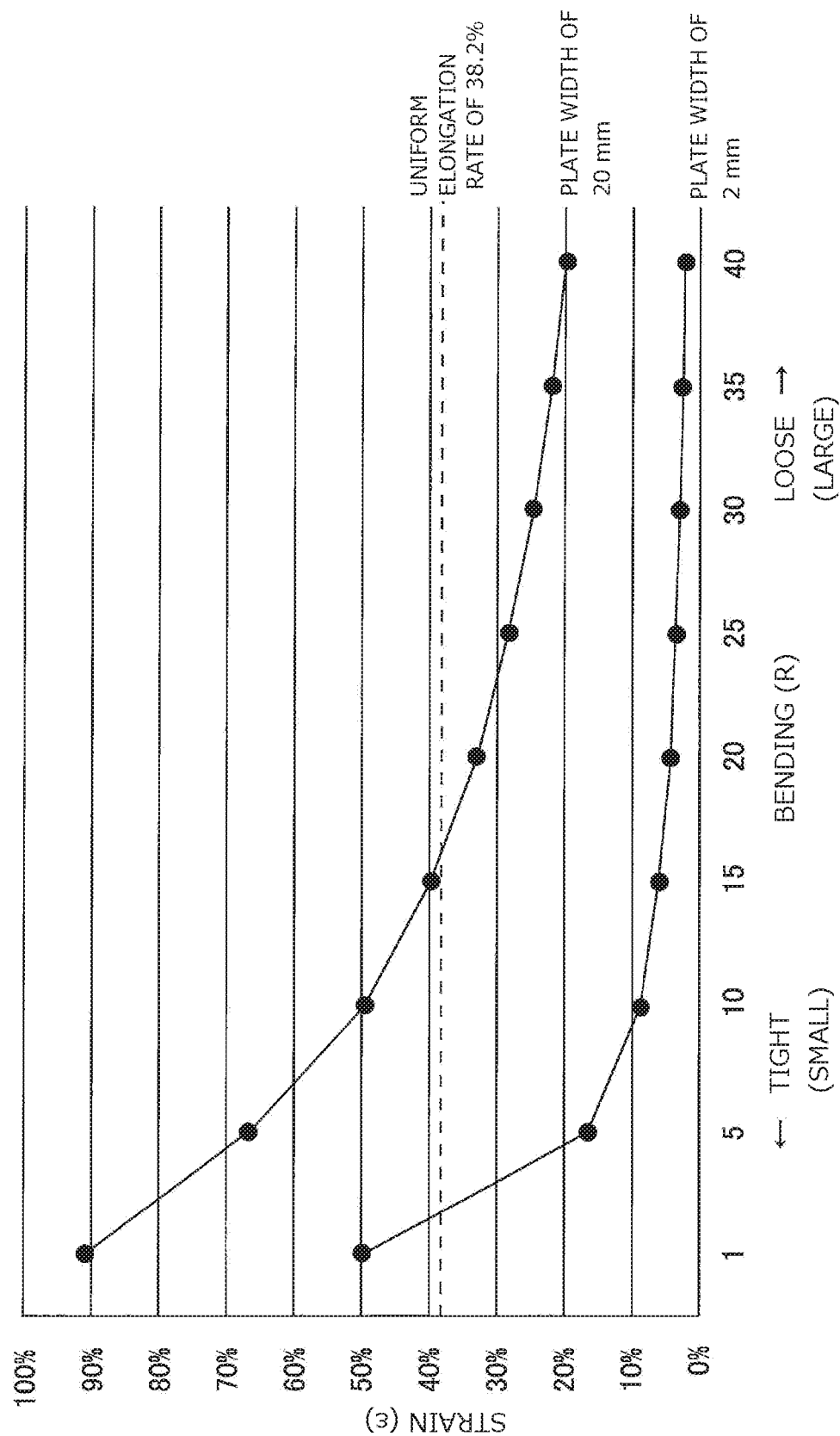

BUS BAR ELECTRIC WIRE WITH A BENT PORTION OF UNIFORM ELONGATION

CROSS REFERENCE TO RELATED APPLICATIONS

This application is based on Japanese Patent Application (No. 2019-005325) filed on Jan. 16, 2019, the contents of which are incorporated herein by reference.

TECHNICAL FIELD

The present invention relates to a bus bar electric wire.

BACKGROUND ART

In a related art, an aluminum electric wire using aluminum as a conductor has been proposed for a purpose of reducing a weight of an electric wire. Such aluminum electric wire is applied to a conductor of a bus bar electric wire which has a flat shape in cross section from a viewpoint of saving space for wiring to a vehicle or the like (see JP-A-2014-238927, JP-A-2016-76316 and JP-A-2018-160317).

In the bus bar electric wire described in for example, JP-A-2014-238927, JP-A-2016-76316 and JP-A-2018-160317, it is necessary to bend the bus bar electric wire in a plane direction of the flat conductor so as to wire the bus bar electric wire in accordance with the vehicle or the like. Accordingly, a crack may occur in an outer side part of a bend of the flat conductor at a time of bending the bus bar electric wire in the plane direction, so that the bus bar electric wire may not satisfy a characteristic of an electric wire.

Accordingly, the present invention has been made in view of the above circumstance in the related art. An aspect of the present invention provides a bus bar electric wire that can prevent a crack from occurring in bending of the bus bar electric wire in a plane direction of the bus bar electric wire.

There is provided a bus bar electric wire including: a flat conductor which is formed of aluminum and inevitable impurities, and which has a cross-section of a substantially rectangular shape, and an area of the cross-section being 15 mm² or more and 240 mm² or less, in which the flat conductor includes a bent portion having a predetermined bending R in a plane direction of the flat conductor, and a conductor part that is an outermost side of a bend in the bent portion has a plate width being set within a range satisfying uniform bending of the conductor part.

According to the present invention, the bus bar electric wire includes the flat conductor which is formed of aluminum and inevitable impurities and has the area of the cross-section of 15 mm² or more and 240 mm² or less. Accordingly, it is possible to prevent a crack from occurring in the bend in the plane direction by limiting the plate width of the bent portion to be within the range of the uniform bending while, for example, ensuring the predetermined area of the cross-section and satisfying a specification as a power supply line or the like.

BRIEF DESCRIPTION OF DRAWINGS

FIG. 3 is a graph showing a correlation among a plate width, bending R, and uniform elongation of a flat conductor of the bus bar electric wire according to the present embodiment.

DESCRIPTION OF EMBODIMENTS

Hereinafter, the present invention will be described according to a preferred embodiment. The present invention is not limited to the embodiment described below, and may be appropriately modified without departing from the scope of the present invention. In the embodiment described below, some configurations are not shown or described, but it goes without saying that a known or well-known technique is appropriately applied to details of an omitted technique within a range in which no contradiction occurs to contents described below.

Figure 1:
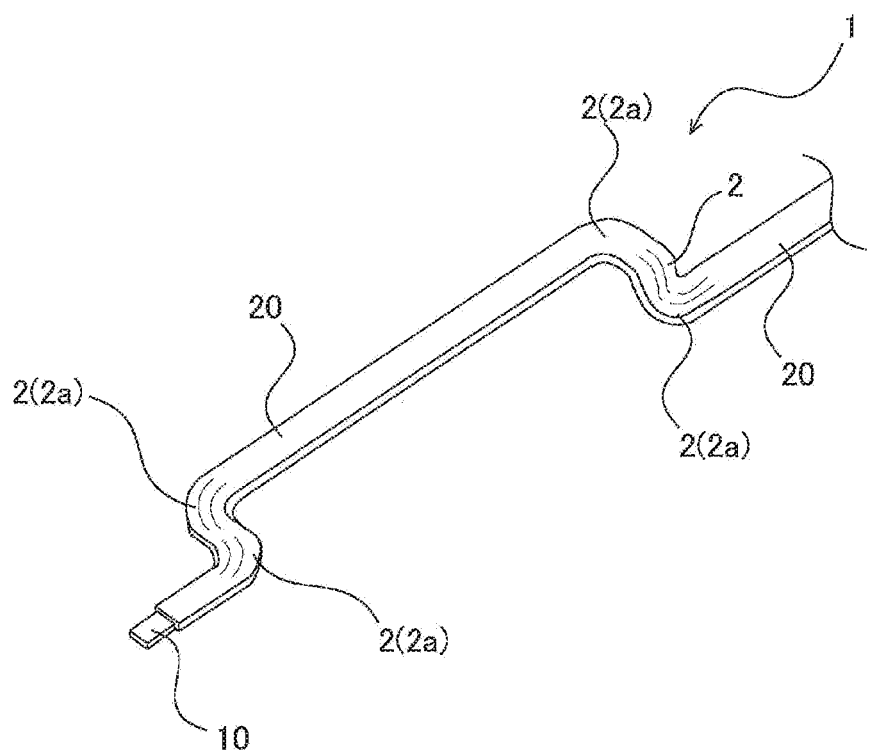
FIG. 1 is a perspective view illustrating a bus bar electric wire according to an embodiment of the present invention.
Figure 2:
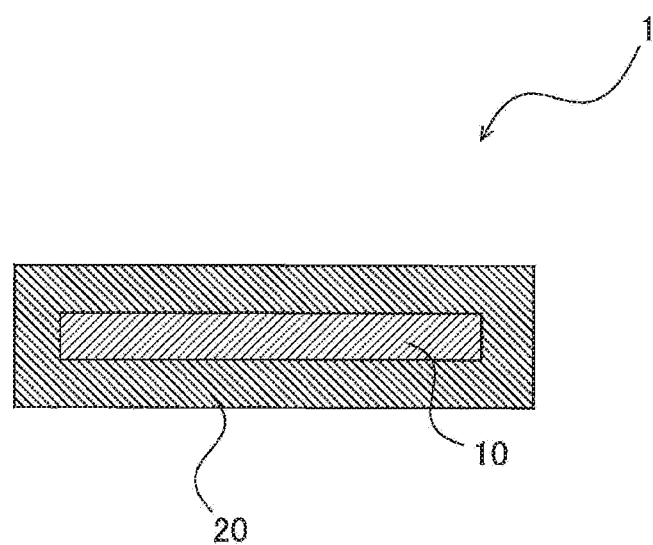
FIG. 2 is a cross-sectional view illustrating a bus bar electric wire according to the embodiment of the present invention.

FIG. 1 is a perspective view illustrating a bus bar electric wire according to the embodiment of the present invention. FIG. 2 is a cross-sectional view illustrating a bus bar electric wire according to the embodiment of the present invention. As illustrated in FIGS. 1 and 2, a bus bar electric wire 1 according to the present embodiment is wired in a vehicle as a wire harness, for example, and includes a flat conductor 10 and an insulating cover 20 which surrounds the flat conductor 10.

The flat conductor 10 is formed of aluminum and inevitable impurities, and has a substantially rectangular cross-sectional shape (which covers scopes of a rectangular shape having a slightly rounded corner and a complete rectangular shape) orthogonal to a longitudinal direction (see FIG. 2).

The insulating cover 20 is formed by an insulator configured to surround an outer periphery of the flat conductor 10. The insulating cover 20 is formed of polypropylene (PP), polyethylene (PE), poly vinyl chloride (PVC), or the like.

In the present embodiment, the flat conductor 10 has a conductor cross-sectional area of 15 mm² or more so as to be used as a power supply line. This is because if the conductor cross-sectional area is less than 15 mm², a specification as a power supply line is difficult. The flat conductor 10 has the conductor cross-sectional area of 240 mm² or less. This is because the conductor cross-sectional area of 240 mm² is considered to be sufficient even in consideration of a future increase in current and the like.

The bus bar electric wire 1 (the flat conductor 10) according to the present embodiment includes bent portions 2 each having predetermined bending R. Bent portions 2a among the bent portions 2 are bent in a plane direction (in-plane) of the flat conductor 10.

In addition, in the flat conductor 10 of the bus bar electric wire 1 according to the present embodiment, a conductor part that is an outermost side of a bend in each bent portion 2a has a plate width within a range of uniform bending. That is, when the flat conductor 10 is bent in the plane direction, if the plate width is large, an outer side of the bend in the conductor is greatly stretched. As a result, a crack may occur. Therefore, the bus bar electric wire 1 according to the present embodiment is limited in the plate width of the flat conductor 10. More specifically, bending to be applied for the bus bar electric wire 1 according to the present embodiment is known in advance when the bus bar electric wire 1 is wired in the vehicle as a power supply line, for example. Therefore, the plate width is set or limited such that a crack does not occur in accordance with the bending to be applied (the predetermined bending R).

Specifically, when the flat conductor 10 has elongation of $\varepsilon$ %, a plate width of w mm, and a bending radius of R mm, ε≥w/(2R+w). This is because, for example, the bus bar electric wire in which a crack does not occur can be provided even if, for example, a bent portion having bending R20 is formed on the flat conductor 10 having the plate width (approximately 4.3 mm or more and 24.7 mm or less) required as a power line of the vehicle.

Further, the insulating cover 20 of the bus bar electric wire 1 according to the present embodiment is formed of a material and a thickness such that the outer side of the bend of each bent portion 2a would not break. For example, when each bent portion 2a is formed in the straight bus bar electric wire 1 in which the insulating cover 20 is formed on the straight flat conductor 10, since the bending R to be applied is known in advance, the material and the thickness of the insulating cover 20 are set such that the insulating cover 20 would not break due to the bending (the predetermined bending R).

Specifically, the insulating cover 20 is formed of a material having the elongation of 35% or more. This is because it is possible to provide the bus bar electric wire having the insulating cover 20 which would not break even if a bend (for example, a bend having bending R1 to 40 required when the bus bar electric wire 1 is wired in the vehicle) is formed when, for example, the insulating cover 20 is formed with a general thickness (a thickness of a part which is the outer side of the bent portion 2a) on the flat conductor 10 having the plate width (approximately 4.3 mm or more and 24.7 mm or less) required as the power line of the vehicle.

In the bus bar electric wire 1 according to the present embodiment, when a length of the flat conductor 10 is 1 mm, an elastic region of the metal forming the flat conductor 10 is $\varepsilon_E$ %, a longitudinal elastic modulus is EN/mm², a plate width is b mm, a plate thickness is h mm, and an equal load is wN, Formula 1 is satisfied.

$$l \leq \sqrt{2 \times ((\varepsilon_E \times E) \times (b \times h^2/6))/w}$$ [Formula 1]

The equal load refers to a uniformly distributed load, and refers to a force per unit length.

This is because, with this configuration, the flat conductor 10 can be prevented from being plastically deformed due to a fact that the other end side of the bus bar electric wire 1 is bent to hang downward due to its own weight, when, for example, the bus bar electric wire 1 is in a cantilevered state where only one end side of the bus bar electric wire 1 is connected to a device and the other end side of the bus bar electric wire 1 is not connected to the device at a time of wiring the bus bar electric wire 1 in the vehicle or the like. That is, a predetermined thickness or more of the flat conductor 10 is secured for the bus bar electric wire 1 having a certain length, so that linearity is maintained and the flat conductor 10 can be prevented from being plastically deformed.

In the present embodiment, the insulating cover 20 has a thickness of 0.2 mm or more in view of breakdown voltage when the bus bar electric wire 1 is used as a power supply line.

The bus bar electric wire 1 illustrated in FIG. 1 may be provided in parallel with a ground wire formed of another bus bar electric wire 1, a round electric wire having a round conductor cross section, or the like.

FIG. 3 is a graph showing a correlation among the plate width, the bending R, and uniform elongation of the flat conductor 10 of the bus bar electric wire 1 according to the present embodiment. FIG. 3 shows a case where the flat conductor 10 is bent in the plane direction.

First, in the graph shown in FIG. 3, it is assumed that a maximum value of the elongation, at which the uniform elongation for an aluminum material used for the flat conductor 10 can be ensured, is 38.2%. When the plate width of the flat conductor 10 is 20 mm, strain (elongation) applied to the conductor on the outer side of the bend when the bending R is 1 mm is 90.9%. Therefore, when the bending R is 1 mm, the plate width must be smaller than 20 mm.

When the plate width of the flat conductor 10 is 20 mm, the strain (the elongation) applied to the conductor on the outer side of the bend when the bending R is 5 mm is 66.7%. Therefore, when the bending R is 5 mm, the plate width must be smaller than 20 mm.

When the plate width of the flat conductor 10 is 20 mm, the strain (the elongation) applied to the conductor on the outer side of the bend when the bending R is 10 mm is 50.0%. Therefore, when the bending R is 10 mm, the plate width must be smaller than 20 mm.

When the plate width of the flat conductor 10 is 20 mm, the strain (the elongation) applied to the conductor on the outer side of the bend when the bending R is 15 mm is 40.0%. Therefore, when the bending R is 15 mm, the plate width must be smaller than 20 mm.

When the plate width of the flat conductor 10 is 20 mm, the strain (the elongation) applied to the conductor on the outer side of the bend when the bending R is mm is 33.3%. Therefore, it can be said that the plate width of 20 mm when the bending R is 20 mm is appropriate such that a crack does not occur.

The plate width of 20 mm in the flat conductor 10 when the bending R is 20 mm is appropriate. Therefore, when the bending R is 25 mm, 30 mm, 35 mm, and 40 mm, the strain (the elongation) is 28.6%, 25.0%, 22.2%, and 20.0%, respectively, so that any plate width of 20 mm is appropriate.

When the plate width of the flat conductor 10 is 1 mm, the strain (the elongation) applied to the conductor on the outer side of the bend when the bending R is 1 mm is 50.0%. Therefore, when the bending R is 1 mm, the plate width must be smaller than 1 mm.

When the plate width of the flat conductor 10 is 1 mm, the strain (the elongation) applied to the conductor on the outer side of the bend when the bending R is 5 mm is 16.7%. Therefore, the plate width of 1 mm when the bending R is 5 mm is appropriate such that a crack does not occur.

The plate width of 1 mm in the flat conductor 10 when the bending R is 5 mm is appropriate. Therefore, when the bending R is 10 mm, 15 mm, 20 mm, 25 mm, 30 mm, 35 mm, and 40 mm, the strain (the elongation) is 9.1%, 6.3%, 4.8%, 3.8%, 3.2%, 2.8%, and 2.4%, respectively, so that any plate width of 1 mm is appropriate.

Thus, the bus bar electric wire 1 according to the present embodiment includes the flat conductor 10 which is formed of aluminum and inevitable impurities and has the conductor cross-sectional area of 15 mm² or more and 240 mm² or less. Accordingly, it is possible to prevent a crack from occurring in the bend in the plane direction by limiting the plate width of the bent portion 2a to be within the range of the uniform bending while, for example, ensuring the predetermined conductor cross-sectional area and satisfying a specification as a power supply line or the like.

When the flat conductor 10 has the elongation of ε %, the plate width of w mm, and the bending radius of R mm, ε≥w/(2R+w). For example, the bus bar electric wire in which a crack does not occur can be provided even if, for example, the bent portion 2a having the bending R20 is formed on the flat conductor 10 having the plate width (approximately 4.3 mm or more and 24.7 mm or less) required as a power line of the vehicle.

The insulating cover 20 is formed of the material and the thickness such that the outer side of the bend of the bent portion 2a would not break. Accordingly, for example, when the bent portion 2a is formed after insulating cover is formed on the straight flat conductor 10, it is possible to prevent a situation where the insulating cover 20 is broken and the flat conductor 10 is exposed, short-circuited, or the like in addition to preventing a crack from occurring in the flat conductor 10.

The insulating cover 20 has the elongation of 35% or more. Accordingly, it is possible to provide the bus bar electric wire having the insulating cover 20 which would not break even if the bend (for example, the bend having the bending R1 to 40 required when the bus bar electric wire 1 is wired in the vehicle) is formed when, for example, the insulating cover 20 is formed with the general thickness (the thickness of the part which is the outer side of the bent portion 2a) on the flat conductor 10 having the plate width (approximately 4.3 mm or more and 24.7 mm or less) required as the power line of the vehicle.

When the length of the flat conductor 10 is 1 mm, the elastic region of the metal forming the flat conductor 10 is $\varepsilon_E$ %, the longitudinal elastic modulus is $E N/mm^2$, the plate width is b mm, the plate thickness is h mm, and the equal load is wN, Formula 1 is satisfied.

$$l \leq \sqrt{2 \times ((\varepsilon_E \times E) \times (b \times h^2 / 6)) / w} \quad \text{[Formula 1]}$$

Accordingly, the flat conductor 10 can be prevented from being plastically deformed due to the fact that the other end side of the bus bar electric wire 1 is bent to hang downward due to its own weight, when, for example, the bus bar electric wire 1 is in the cantilevered state where only the one end side of the bus bar electric wire 1 is connected to the device and the other end side of the bus bar electric wire 1 is not connected to the device at the time of wiring the bus bar electric wire 1 in the vehicle or the like.

The present invention has been described based on the embodiment. However, the present invention is not limited to the embodiments described above and can be appropriately modified without departing from the spirit of the present invention, and may be appropriately combined with well-known and known techniques if possible.

For example, the bus bar electric wire 1 according to the present embodiment is assumed to be used as a power supply line of a vehicle using a high voltage which is an electric vehicle or a hybrid vehicle. However, the present invention is not limited thereto, and may be used for other types of vehicles, other devices, or the like. The present invention is not limited to be used in a power supply line, and may be used in other applications which are a signal line and the like.

What is claimed is:

1. A bus bar electric wire comprising:
   a flat conductor which is formed of aluminum and inevitable impurities, and which has a cross-section of a substantially rectangular shape, and an area of the cross-section being 15 mm² or more and 240 mm² or less,
   wherein the flat conductor includes a bent portion having a predetermined bending R in a plane direction of the flat conductor, and a conductor part that is an outermost side of a bend in the bent portion has a plate width being set within a range satisfying uniform bending of the conductor part, and
   wherein when the flat conductor has a maximum elongation of 38.2%, a plate width of w mm, and a bending radius of R mm, 38.2% >w/(2R +w) is satisfied.

2. The bus bar electric wire according to claim 1, further comprising:
   an insulating cover that covers an outer periphery of the flat conductor,
   wherein the insulating cover is formed of a material and a thickness such that an outer side of a bend of the bent portion would not break.

3. The bus bar electric wire according to claim 2,
   wherein the insulating cover is formed of a material having elongation of 35% or more.

4. The bus bar electric wire according to claim 2,
   wherein when a length of the flat conductor is l mm, an elastic region of a metal forming the flat conductor is $\varepsilon_E$ %, a longitudinal elastic modulus of the metal is $E N/mm^2$, a plate width of the flat conductor is b mm, a plate thickness of the flat conductor is h mm, and an equal load applied to the flat conductor is wN, $$l \leq \sqrt{2 \times ((\varepsilon_E \times E) \times (b \times h^2 / 6)) / w} \quad \text{[Formula 1]}$$

the Formula 1 is satisfied.

* * * * *